(12) United States Patent
Moreno Linares et al.

(10) Patent No.: US 9,168,470 B2
(45) Date of Patent: Oct. 27, 2015

(54) FILTER ELEMENT OF A FILTER DEVICE AND FILTER DEVICE

(71) Applicant: MANN+HUMMEL GMBH, Ludwigsburg (DE)

(72) Inventors: Andrés Moreno Linares, Sindelfingen (DE); Florentin Van Uffelen, Ludwigsburg (DE); Silke Miess, Ludwigsburg (DE); Gerhard Seidler, Sindelfingen (DE); Marco Goedecke, Freiberg (DE)

(73) Assignee: MANN + HUMMEL GMBH, Ludwigsburg (DE)

( * ) Notice: Subject to any disclaimer, the term of this patent is extended or adjusted under 35 U.S.C. 154(b) by 372 days.

(21) Appl. No.: 13/661,843

(22) Filed: Oct. 26, 2012

(65) Prior Publication Data

US 2013/0292322 A1    Nov. 7, 2013

(30) Foreign Application Priority Data

Oct. 28, 2011    (DE) .......................... 10 2011 117 173

(51) Int. Cl.
| | |
|---|---|
| *B01D 27/10* | (2006.01) |
| *B01D 35/147* | (2006.01) |
| *B01D 35/153* | (2006.01) |
| *B01D 29/21* | (2006.01) |
| *F16K 15/14* | (2006.01) |

(52) U.S. Cl.
CPC .............. *B01D 27/106* (2013.01); *B01D 29/21* (2013.01); *B01D 35/147* (2013.01); *B01D 35/153* (2013.01); *B01D 2201/0415* (2013.01); *B01D 2201/291* (2013.01); *B01D 2201/295* (2013.01); *B01D 2201/34* (2013.01); *F16K 15/148* (2013.01)

(58) Field of Classification Search
None
See application file for complete search history.

(56) References Cited

U.S. PATENT DOCUMENTS

| | | | |
|---|---|---|---|
| 3,339,738 A | 9/1967 | Wilhelm et al. | |
| 3,567,023 A * | 3/1971 | Buckman et al. | ............. 210/130 |
| 6,284,130 B1 | 9/2001 | Daniel | |
| 8,177,967 B2 * | 5/2012 | Bagci et al. | ................... 210/133 |
| 8,613,854 B2 | 12/2013 | Jainek | |

(Continued)

FOREIGN PATENT DOCUMENTS

| | | |
|---|---|---|
| DE | 19641369 A1 | 4/1998 |
| FR | 2226199 A1 | 11/1974 |
| FR | 2248069 A1 | 5/1975 |
| WO | WO 2009060072 A1 * | 5/2009 |

OTHER PUBLICATIONS

Search Report of EP 12185331.1-2113 of Jan. 9, 2013.

(Continued)

*Primary Examiner* — Terry Cecil
(74) *Attorney, Agent, or Firm* — James Hasselbeck

(57) ABSTRACT

A filter element (32) and a filter device (10). The filter element (32) can be arranged in a filter housing (16) of the filter device. The filter element (32) has an annular closed filter medium (34) connected with at least at one end face with an end member (36, 38). An annular anti-drain membrane (44) opens and closes at least one fluid opening (26) of the filter housing (16) and is arranged on the side of the at least one end member (38) that is facing away from the filter element (34). The surface of the contact section (60) of the anti-drain membrane (44) has at least one relief-like adhesion disturbance area (64) for disturbing an adhesion of the anti-drain membrane (44) to the contact section (60).

6 Claims, 4 Drawing Sheets

(56) References Cited

U.S. PATENT DOCUMENTS

2004/0011715 A1  1/2004  Assion
2005/0161378 A1  7/2005  Cline
2005/0178706 A1  8/2005  Bagci

OTHER PUBLICATIONS

DPMA Office Action on priority (parent) DE102011117173.1, not dated.

* cited by examiner

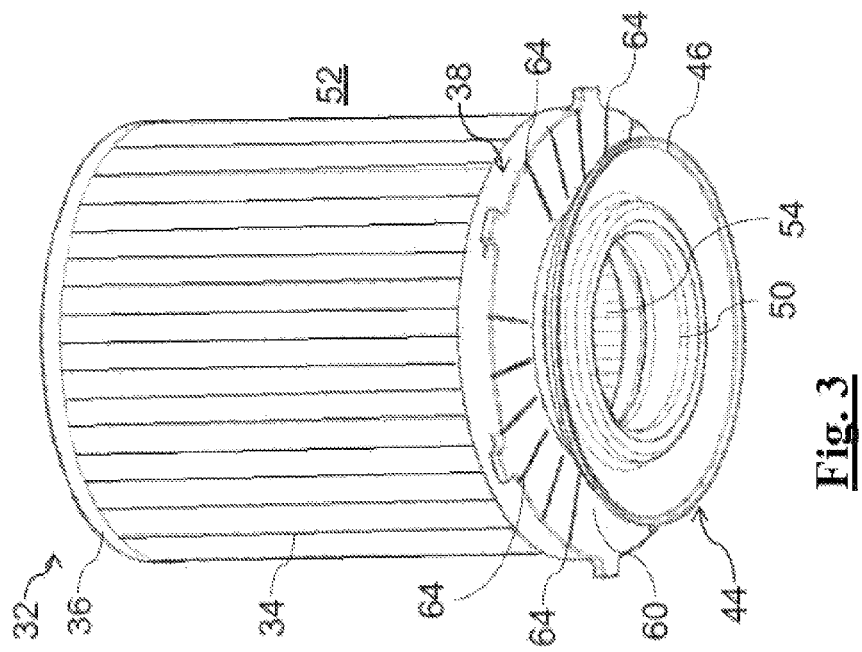
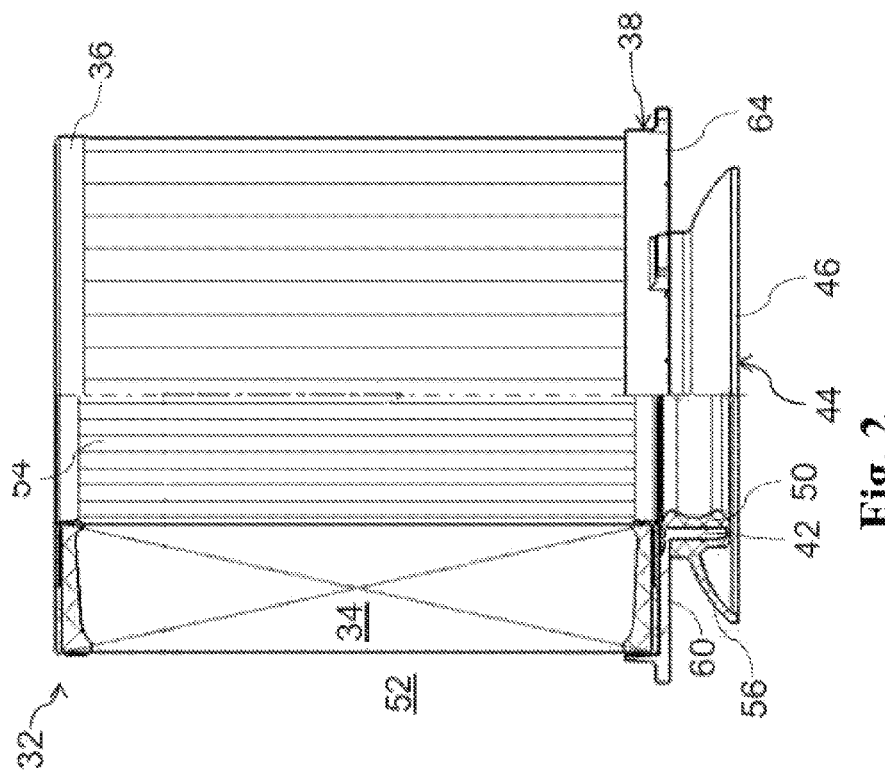

FILTER ELEMENT OF A FILTER DEVICE AND FILTER DEVICE

CROSS REFERENCE TO RELATED APPLICATIONS

The present application claims the benefit of prior filed German patent application no. 102011117173.1 filed in Germany on Oct. 28, 2011, the entire disclosure of which is incorporated herein by reference.

TECHNICAL FIELD

The invention concerns a filter element of a filter device for filtering a fluid, in particular oil or fuel, in particular of an internal combustion engine, particularly of a motor vehicle, that can be arranged in a filter housing of the filter device, comprising an annular closed filter medium that is connected at least at one end face with an end member and comprising an annular anti-drain membrane, arranged on the side of the at least one end member that is facing away from the filter medium, for opening and closing at least one fluid opening of the filter housing.

The invention moreover concerns a filter device for filtering a fluid, in particular oil or fuel, in particular of an internal combustion engine, particularly of a motor vehicle, comprising a filter element that is arranged in a filter housing of the filter device and that comprises an annular closed filter medium that is connected at least at one end face with an end member and comprising an annular anti-drain membrane, arranged on the side of the at least one end member that is facing away from the filter medium, for opening and closing at least one fluid opening of the filter housing.

BACKGROUND OF THE INVENTION

WO 2009/060072 A1 discloses a filter element for use in a filter housing that can be opened. The filter element has an annular closed filter medium that is connected at the end faces with an upper end disk and a lower end disk. An anti-drain membrane is arranged such at the lower end disk that it covers within the filter housing an inlet opening. In normal operation of the liquid filter, the fluid to be purified flows through the inlet opening and lifts a sealing rim of the anti-drain membrane off the surface of a housing bottom part.

SUMMARY OF THE INVENTION

An object of the invention is to design a filter element and a filter device of the aforementioned kind such that reliability, in particular response behavior of the anti-drain membrane, is further improved. In particular, the susceptibility to wear should be reduced as possible.

This object is solved according to the invention in that, in a maximum open state, the anti-drain membrane is resting flat with a back that is facing the at least one end member against a surface of a contact section of the at least one end member that is facing this back and the surface of the contact section that is facing the back of the anti-drain membrane has at least one relief-like adhesion disturbance area for disturbing adhesion of the anti-drain membrane to the contact section of the at least one end member.

According to the invention, the surface of the contact section is thus not continuously smooth but provided with at least one relief-like adhesion disturbance area. In this way it is prevented that the back of the anti-drain membrane upon contacting the contact section can tightly adhere like a suction cup or gets stuck in a different way. In this way, the response behavior of the anti-drain membrane is improved in particular upon transition from the maximum open state into the closed state. The relief-like adhesion disturbance area can advantageously have volumes that are open toward the back of the anti-drain membrane. The open volumes interrupt the surface of the contact section that is otherwise approximately uniform and in particular smooth. In this way, adhesion by suction of the back of the anti-drain membrane to the contact section of the least one end member can be counteracted. Since the adhesion disturbance area is arranged on the at least one end member, the back of the anti-drain membrane can be designed to be otherwise uniform, in particular smooth. This has a positive effect on its flexibility.

During opening and closing, it can therefore be uniformly deformed, in particular curved, and can enable a uniform opening process and closing process. In a view from the at least one fluid opening, the anti-drain membrane can advantageously be shaped concavely in the rest state in which it can seal the at least one fluid opening. A fluid flow through the fluid opening toward the anti-drain membrane can lift the anti-drain membrane off the at least one fluid opening. The anti-drain membrane can be bent by the fluid flow elastically toward the at least one end member. The concave shape has the effect that the anti-drain membrane is then elastically tensioned. The anti-drain membrane in the open state can be resting flat with its back on the contact section. The contact section can serve as a stop for the anti-drain membrane in order to prevent a further folding over of the anti-drain membrane. The flat contact also prevents that the anti-drain membrane is deformed. This reduces wear. Moreover, it is prevented in this way that the anti-drain membrane resting flat against the contact section flutters within the fluid flow; this also has a positive result on wear of the anti-drain membrane. Upon interruption of the fluid flow or a reversal of the fluid flow the mechanical tension has the effect that the anti-drain membrane is automatically returned into the rest state and closes the at least one fluid opening. In this way, a return flow of fluid into the at least one fluid opening is prevented. Advantageously, the at least one end member can be an end disk. An end disk can be realized in a simple and space-saving way. Advantageously, the anti-drain membrane can be connected in radial direction inwardly or outwardly with the at least one end member.

In an advantageous embodiment, the at least one adhesion disturbance area can have at least one recess and/or at least one projection. Recesses and projections can be formed integrally in a simple way in particular when molding the at least one end member in a single working step. They can also be shaped or molded subsequently. Recesses can be simply cut, drilled, etched or milled into the surface of the end member. Projections can be adhesively attached or welded on. Recesses can be designed simply such that, when the anti-drain membrane is resting flat on the contact section, they cause smaller deformations of the back of the anti-drain membrane than projections. In this way, the wear of the anti-drain membrane can be further reduced.

Advantageously, the at least one recess can be channel-like. Channel-like recesses have an elongate extension wherein their length is greater than their width. Channel-like recesses can extend within the contact section and connect fluidically various areas within the contact section with each other. With respect to its width on either side of the at least one channel-like recess, the back of the anti-drain membrane can be supported on the surface of the contact section. Deformations of the anti-drain membrane when resting on the contact section of the at least one end member can thus be reduced further.

Advantageously, a plurality of channel-like recesses can extend in the contact section in radial direction from an inward area to an outward area. The channel-like recesses can advantageously be distributed circumferentially. They can be uniformly distributed so that the disturbance of the adhesion is as homogenous as possible across the entire contact section. This may further improve the response behavior of the anti-drain membrane.

According to a further advantageous embodiment, the adhesion disturbance area can provide a fluid connection in an area outside of the contact section; optionally, the at least one channel-like recess can extend past the contact section. In this way, upon contacting of the anti-drain membrane on the contact section, a possibly resulting underpressure, which may cause the anti-drain membrane to adhere by suction on the contact section, can be counteracted in that fluid from the exterior of the contact section can flow to the contact section through the at least one channel-like recess.

Advantageously, a width of the at least one recess can be smaller than 1 mm, preferably approximately 0.5 mm, and its depth can be smaller than 1 mm, preferably approximately 0.4 mm. In this way, a flat uniform contacting of the anti-drain membrane on the contact section can be enabled. In this way, with the at least one recess an optimal pressure compensation can be realized for preventing underpressure between the anti-drain membrane and the contact section.

The object is solved further according to the invention by the filter device in that, in the maximum open state, the anti-drain membrane is resting flat with a back that is facing the at least one end member against a surface of the contact section of the end member that is facing this back and the surface of the contact section that is facing the back of the anti-drain membrane has at least one relief-like adhesion disturbance area for disturbing adhesion of the anti-drain membrane to the contact section of the at least one end member. The advantages and features that have been discussed in connection with the filter element according to the invention apply likewise to the filter device according to the invention and its advantageous embodiments.

BRIEF DESCRIPTION OF THE DRAWINGS

Further advantages, features and details of the invention result from the following description in which an embodiment of the invention will be explained in more detail with the aid of the drawing. A person of skill in the art will consider the features disclosed in combination in the drawing, the description and the claims also expediently individually and combine them to other meaningful combinations. It is shown schematically in FIG. 1 schematically shows a section of an oil filter of an internal combustion engine of a motor vehicle with an exchangeable round filter element that comprises an anti-drain membrane at a lower end disk;

FIG. 2 schematically shows the round filter element of FIG. 1 showing one half in section;

FIG. 3 is an isometric schematic illustration of the round filter element of FIGS. 1 and 2 looking onto the lower end disk with the anti-drain membrane;

In the Figures same components are identified with the same reference numerals.

DETAILED DESCRIPTION

Figure 1:
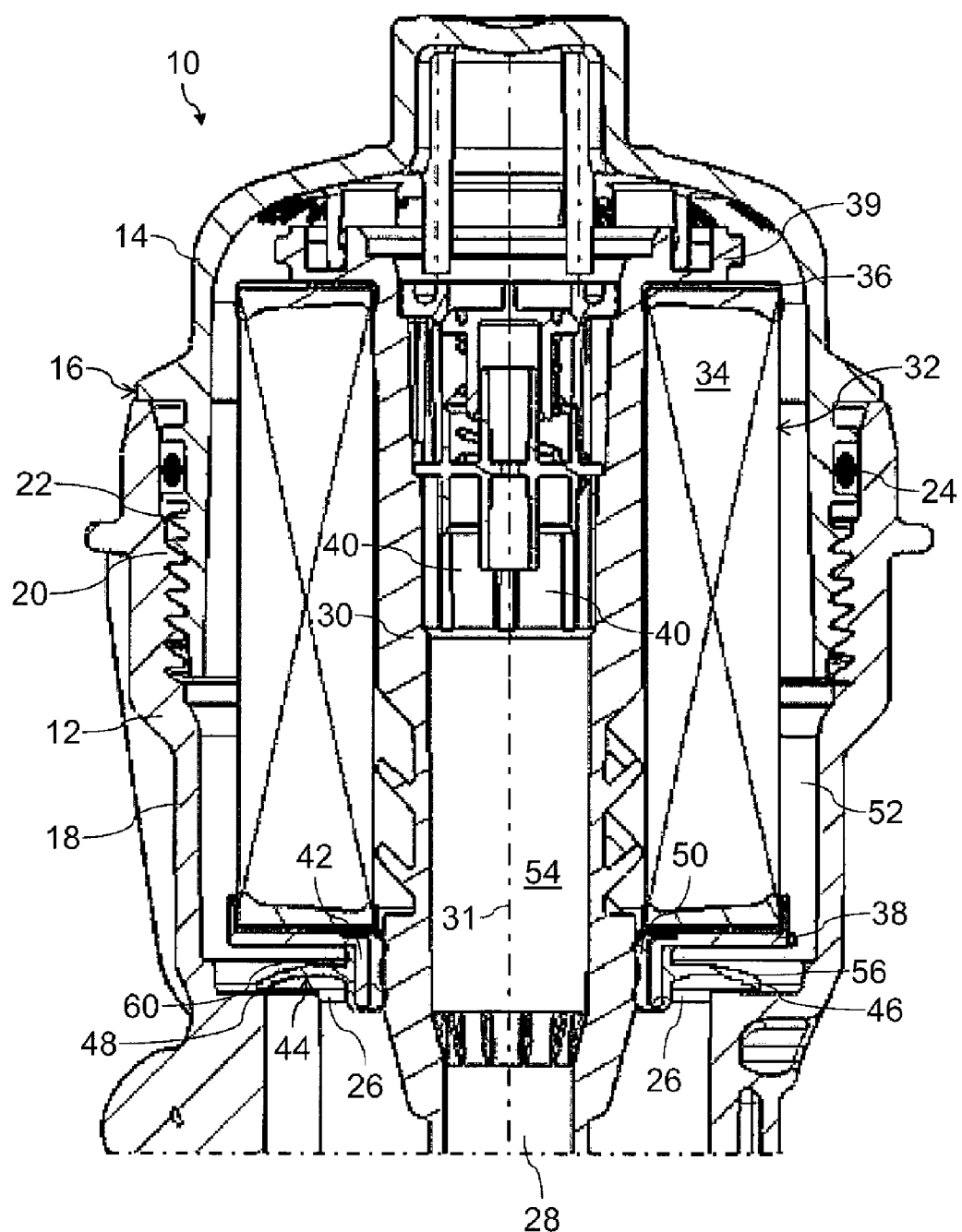
Figure 5:
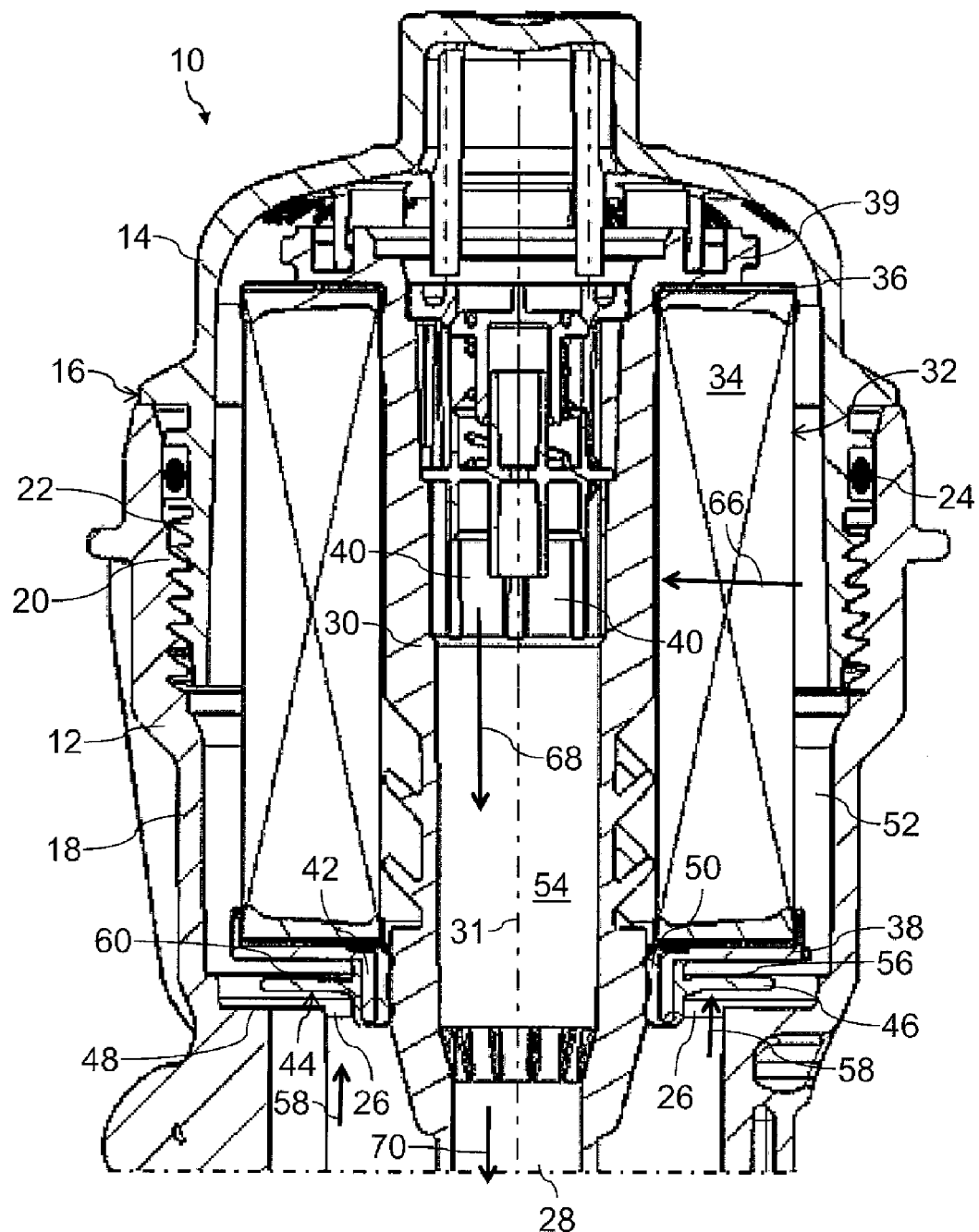
FIG. 5 schematically depicts the oil filter of FIG. 1 wherein the anti-drain membrane is shown in the open state.

In FIGS. 1 and 5, an oil filter 10 of a motor oil circuit of an internal combustion of a motor vehicle is illustrated in section. The oil filter 10 serves for filtering the motor oil.

The oil filter 10 comprises a housing bottom part 12 and a housing top part 14 of a the filter housing, referenced as a whole by 16. The housing bottom part 12 has a cup 18 that is open at the top and is provided with an inner thread 20 at its inner wall. An outer thread 22 of the housing top part 14 engages this inner thread 20 so that the housing parts 12 and 14 are detachably secured to each other. For sealing between the housing parts 12 and 14 an O-ring 24 is provided.

In the interior of the housing bottom part 12 a plurality of inlet openings 26 for the motor oil to be filtered and a central outlet opening 28 for filtered motor oil are arranged. The outlet opening 28 is connected with the interior of a central tube 30. The central tube 30 is arranged coaxial to a filter axis 31. The inlet openings 26 are located relative to the filter axis 31 radially outside of the central tube. When in the following "radial", "axial" or "circumferential" is used, this is relating to the filter axis 31 if nothing different is explicitly mentioned.

On the central tube 30 an exchangeable round filter element 32 is positioned coaxially. The round filter element 32 has a zigzag-shaped folded and annular closed filter medium 34. At its end face, the filter medium 34 is seal-tightly connected by means of an adhesive connection with an upper end disk 26 and a lower end disk 38, respectively. The upper end disk 36 is resting tightly on the support collar 39 of the central tube 30 supporting the filter medium 34. The central tube 30 has a plurality of penetrations 40 that are permeable for the motor oil. At the lower end disk 38, on the side that is facing away from the filter medium 34, a downwardly projecting continuous annular projection 42 is arranged. On the projection 42 an elastic annular anti-drain membrane 44 is injection-molded. The anti-drain membrane 44 is illustrated in detail also in FIGS. 2 to 4.

The anti-drain membrane 44 is concavely curved when viewed from the inlet openings 26. In radial direction outwardly, it has a circumferentially extending sealing rim 46 which, in the closed state that is also the rest state, is supported on a circumferentially extending sealing surface 48 of the housing bottom part 12, as illustrated in FIG. 1. The sealing surface 48 surrounds the inlet openings 26 outwardly in radial direction. On the radial inner circumferential side of the projection 42 a radial sealing section 50 is arranged which is seal-tightly supported on the radial outer circumferential side of the central tube 30. In this way, a seal-tight separation between a raw side 52 and a clean side 54 of the round filter element 32 is provided. The clean side 54 is located in the interior of the round filter element 32, the raw side 52 outside.

The anti-drain membrane 44 is designed such that, upon flow of the motor oil through the inlet openings 26, indicated in FIG. 5 by arrows 58, it can be bent towards the lower end disk 38. A back 56 of the anti-drain membrane 44 that is facing away from the inlet openings 26 can then rest flat against the surface of a contact section 60 of the lower end disk 38 that is facing it. The contact section 60 extends circumferentially, on the one hand, and in radial direction from the projection 42 in radial direction outwardly to the level of the sealing rim 46 of the anti-drain membrane 44, on the other hand. The contact section 60 extends thus across the area in which the back 56 of the anti-drain membrane 44 in its maximum open state, illustrated in FIG. 5, can rest against the lower end disk 38.

Figure 4:
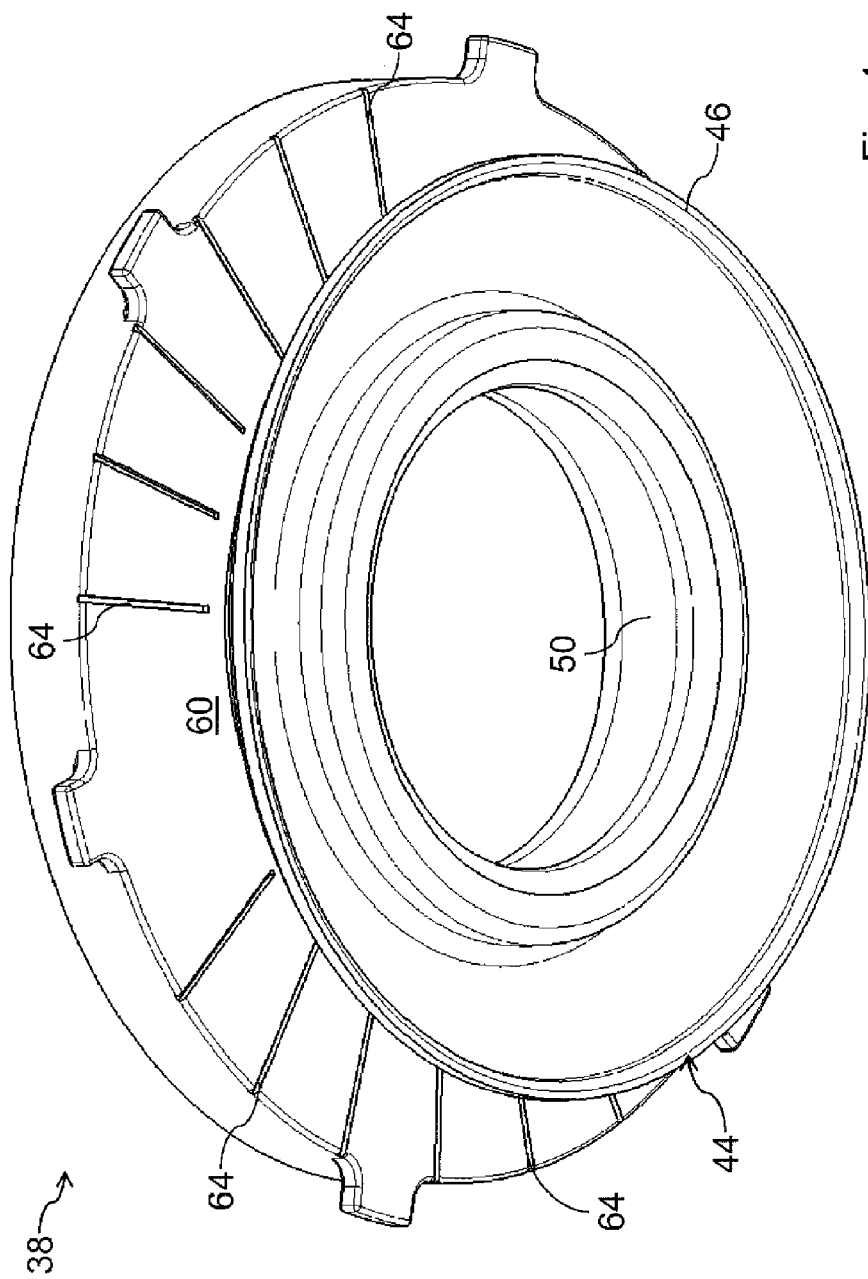
FIG. 4 is a detail view of the lower end disk with the anti-drain membrane of the round filter element of FIGS. 1 to 3.

In the contact section 60 a plurality of relief-like adhesion disturbance areas in the form of channel-like recesses 64 is arranged. The recesses 64 are shown in FIGS. 2 to 4 in detail. The recesses 64 are distributed in groups circumferentially in the surface of the lower end disk 38. The recesses 64 extend radially to the filter axis 31 approximately from the projection 42 to the radial outer rim of the lower end disk 38. They are open toward the radial outer circumferential side of the lower end disk 38. The recesses 64 thus extend past the contact section 60 toward the raw side 52.

The extension of the recesses 64 in the circumferential direction, i.e., their width, is smaller than 1 mm, preferably approximately 0.5 mm, respectively. Their depth in axial direction is smaller than 1 mm, preferably approximately 0.4 mm, respectively. In this way, the back 56 of the anti-drain membrane 44 can rest flat against the contact section 60 without the anti-drain membrane 44 being deformed in the area of the recesses 64. The contact area of the anti-drain membrane 44 at the contact section 60 in relation to the width of the recesses 64 is so large that the anti-drain membrane 44 cannot be pressed into the recesses 64.

In operation of the oil filter 10, the motor oil to be purified that is flowing in through the inlet openings 26 forces the anti-drain membrane 44 into the maximum opening state, as illustrated in FIG. 5, against the contact section 60 and thus releases the inlet openings 26. The anti-drain membrane 44 in the open state is under mechanical tension. The motor oil flows to the raw side 52 and from the radial outward position through the filter medium 34, where it is purified, in radial direction inwardly, indicated in FIG. 5 by arrow 66, and through the passages 40 into the interior of the central tube 30. From here, the purified motor oil, indicated by arrow 68 and arrow 70, flows through the outlet opening 28 out of the filter housing 16 and is supplied to the motor oil circuit.

In the rest state, when no motor oil flows through the inlet openings 26, the sealing rim 46 rests sealingly on the sealing surface 48, as indicated in the FIG. 1, and prevents in this way that motor oil can flow from the raw side 52 back into the inlet openings 26. Because of the anti-drain membrane 44 a complete drainage of the filter housing 16 is thus prevented so that, when starting the internal combustion engine anew, motor oil is available immediately.

Upon transfer from the open state into the rest state, for example, upon interruption of the oil flow, as is the case, for example, upon operational stop of the internal combustion engine, the anti-drain membrane 44 as a result of its mechanical tension is bent from the contact section 60 back to the sealing surface 48. The recesses 64 prevent in this connection that the back 56 of the anti-drain membrane 44 can become attached by suction on the contact section 60. Because of the recesses 64, motor oil from the raw side 52 outside of the contact section 60 can flow to the area between the contact section 60 and the back 56 of the anti-drain membrane 44. Underpressure that may occur is counteracted in this way. This inflow of motor oil via the recesses 64 enhances also the return movement of the anti-drain membrane 44 toward the sealing surface 48.

In the above described embodiment of an oil filter 10 and a round filter element 32, the following modifications are possible inter alia:

The invention is not limited to an oil filter 10 of internal combustion engines of motor vehicles. It can also be used in other types of liquid filters, for example, for water or fuel. Instead of an internal combustion engine for motor vehicles, it can also be used in other types of internal combustion engines, for example, industrial motors.

The invention can also be used in connection with oil filters 10 that cannot be opened and a filter element 32 that is not exchangeable.

The anti-drain membrane 44, instead of being injection-molded onto the projection 42, can also be connected in a different way to the lower end disk 38. For example, it can be glued, welded or monolithically formed on the lower end disk 38.

The anti-drain membrane 44, instead of being connected in radial direction inwardly, can also be connected in radial direction outwardly with the lower end disk 38.

In addition to or instead of the channel-type recesses 64, the relief-like adhesion disturbance area can have also other relief-like structures.

In addition or instead of the recesses 64, also projections can be provided on the surface of the lower end disk 38 in the area of the contact section 60 in order to realize the relief-like adhesion disturbance area.

The recesses 64, instead of being radial, can also extend from the radial inner position to the radial outer position in a slanted, curved or meandering fashion.

The recesses 64, instead of extending past the contact section 60, can also be arranged entirely within the contact section 60.

The upper end disk 36 and/or the lower end disk 38 can also be connected seal-tightly with the filter medium 34 in a different way than by a respective glue connection. It is also possible to provide only a lower end disk 38.

The anti-drain membrane 44, instead of being arranged at the lower end disk 38, can also be arranged at the upper and disk 36.

Instead of the end disks 36 and 38, also other types of end members can be provided.

The filter medium 34, instead of being folded in a zigzag shape, can also be annularly closed in a different way.

Instead of the round filter element 32, a different annular, for example, oval or angular, filter element can be used also.

The invention claimed is:

1. A filter element (32) of a filter device (10) for filtering a fluid that may be installed into a filter housing (16) of the filter device (10), comprising:
   an annular closed filter medium (34) defining an axis and having two axial end faces;
   at least one end member (36, 38) secured to one of said axial end faces, said at least one end member (36, 38) including
      a contact section arranged on an axially outwardly facing side of said at least one end member (36, 38);
   an annular anti-drain membrane (44) that is arranged on and outwardly facing side of the at least one end member (38) facing away from the filter medium (34), said anti-drain membrane (44) operable for opening and closing at least one fluid opening (26) of the filter housing (16), said anti-drain membrane (44) including
      a back (56) that is facing and movable into a position against the at least one end member (38);
   wherein the anti-drain membrane (44), in a maximum open state, abuts against and rests flat upon a surface of said contact section (60) of the at least one end member (38) that is facing the back (56);
   wherein the surface of the contact section (60) that is facing the back (56) of the anti-drain membrane (44) includes at least one relief-like adhesion disturbance area (64) for disturbing adhesion of the anti-drain membrane (44) to the contact section (60) of the at least one end member (38);

wherein the at least one adhesion disturbance area has a plurality of radially extending recesses (64), the width of each recess being substantially smaller than the distance between any two adjacent recesses of said plurality of recesses.

2. The filter element according to claim 1, wherein at least one recess (64) is channel-like.

3. The filter element according to claim 2, wherein a plurality of channel-like recesses (64) extend in the contact section (60) in radial direction from an inner area to an outer area.

4. The filter element according to claim 3, wherein the adhesion disturbance area has a fluid connection in an area outside of the contact section;

wherein the plurality of channel-like recesses (64) extended past the contact section (60).

5. The filter element according to claim 1, wherein a width of at least one recess (64) is smaller than 1 mm; and wherein a depth of at least one recess (64) is smaller than 1 mm.

6. A filter device (10) for filtering a fluid, comprising:

an openable filter housing (16);

a filter element (32) exchangeably and removeably arranged within the filter housing (16), the filter element including an annular closed filter medium (34) defining an axis and having two axial end faces;

at least one end member (36, 38) secured to one of said axial end faces, said at least one end member (36, 38) including a contact section arranged on an axially outwardly facing side of said at least one end member (36, 38);

an annular anti-drain membrane (44) that is arranged on an outwardly facing side of the at least one end member (38) facing away from the filter medium (34), said anti-drain membrane (44) operable for opening and closing at least one fluid opening (26) of the filter housing (16), said anti-drain membrane (44) including a back (56) that is facing and movable into a position against the at least one end member (38);

wherein the anti-drain membrane (44), in a maximum open state, abuts against and rests flat upon a surface of said contact section (60) of the at least one end member (38) that is facing the back (56);

wherein the surface of the contact section (60) that is facing the back (56) of the anti-drain membrane (44) includes at least one relief-like adhesion disturbance area (64) for disturbing adhesion of the anti-drain membrane (44) to the contact section (60) of the at least one end member (38);

wherein the at least one adhesion disturbance area has a plurality of radially extending recesses (64), the width of each recess being substantially smaller than the distance between any two adjacent recesses of said plurality of recesses.

* * * * *